(12) United States Patent
Hashimoto

(10) Patent No.: US 11,778,128 B2
(45) Date of Patent: Oct. 3, 2023

(54) BROADCASTING CONTROL APPARATUS, BROADCASTING CONTROL METHOD, PROGRAM, AND RECORDING MEDIUM

(71) Applicants: NEC Platforms, Ltd., Kawasaki (JP); NEC Corporation, Tokyo (JP)

(72) Inventor: Kiyoshi Hashimoto, Kanagawa (JP)

(73) Assignees: NEC Platforms, Ltd., Kanagawa (JP); NEC CORPORATION, Tokyo (JP)

( * ) Notice: Subject to any disclaimer, the term of this patent is extended or adjusted under 35 U.S.C. 154(b) by 216 days.

(21) Appl. No.: 17/436,198

(22) PCT Filed: Mar. 12, 2020

(86) PCT No.: PCT/JP2020/010831
§ 371 (c)(1),
(2) Date: Sep. 3, 2021

(87) PCT Pub. No.: WO2020/189504
PCT Pub. Date: Sep. 24, 2020

(65) Prior Publication Data
US 2022/0150385 A1 May 12, 2022

(30) Foreign Application Priority Data
Mar. 20, 2019 (JP) ................................ 2019-053031

(51) Int. Cl.
*H04N 5/067* (2006.01)
*H04N 21/242* (2011.01)
(Continued)

(52) U.S. Cl.
CPC ......... *H04N 5/0675* (2013.01); *H04N 21/242* (2013.01); *H04H 20/18* (2013.01); *H04H 60/40* (2013.01)

(58) Field of Classification Search
None
See application file for complete search history.

(56) References Cited

U.S. PATENT DOCUMENTS

2015/0382024 A1 12/2015 Oh et al.
2016/0142756 A1* 5/2016 Scott ................. H04N 21/8547
725/116
(Continued)

FOREIGN PATENT DOCUMENTS

JP 2008-070335 A 3/2008
JP 2010-272071 A 12/2010
(Continued)

OTHER PUBLICATIONS

Extended European Search Report for EP Application No. 20774015.0, dated Oct. 19, 2022.
(Continued)

*Primary Examiner* — James R Marandi
(74) *Attorney, Agent, or Firm* — Sughrue Mion, PLLC

(57) ABSTRACT

Provided is a broadcasting control apparatus configured to generate a system time for broadcasting control, the system time being synchronized with a reference time in accordance with a predetermined time protocol, and configured to correct, when leap second adjustment information indicating that leap second adjustment is scheduled to be completed at a first time in the reference time is received, the system time by a correction amount depending on a time length D over a correction period having the time length D from a second time earlier than the first time, the time length D being set such that a correction amount per second of the system time is equal to or less than a cycle corresponding to an inverse of a video frame rate.

18 Claims, 14 Drawing Sheets

(51) Int. Cl.
*H04H 60/40* (2008.01)
*H04H 20/18* (2008.01)

(56) References Cited

U.S. PATENT DOCUMENTS

| | | | |
|---|---|---|---|
| 2017/0142672 | A1 | 5/2017 | Barker |
| 2017/0257647 | A1 | 9/2017 | Iguchi et al. |
| 2018/0027285 | A1 | 1/2018 | Shimofure et al. |
| 2018/0069728 | A1 | 3/2018 | Kitazato |
| 2018/0295409 | A1 | 10/2018 | Takahashi et al. |
| 2020/0112762 | A1* | 4/2020 | Iguchi ................ H04N 21/4347 |

FOREIGN PATENT DOCUMENTS

| | | | |
|---|---|---|---|
| JP | 2015-059851 | A | 3/2015 |
| JP | 2016-054437 | A | 4/2016 |
| JP | 2016-100892 | A | 5/2016 |
| JP | 6264501 | B | 1/2018 |
| KR | 10-2018-0069794 | A | 6/2018 |
| WO | 2016/171001 | A1 | 10/2016 |

OTHER PUBLICATIONS

M. Kuhn, "Coordinated Universal Time with Smoothed Leap Seconds (UTC-SLS)", draft-kuhn-leapsecond-00.txt, XP015044310 (Reference cited in #2), University of Cambridge, Jan. 2006.
Korean Office Action for KR Application No. 10-2021-7029535 dated Sep. 19, 2022 with English Translation.
International Search Report for PCT Application No. PCT/JP2020/010831, dated Jun. 9, 2020.
English translation of Written opinion for PCT Application No. PCT/JP2020/010831, dated Jun. 9, 2020.
ARIB (Association of Radio Industries and Businesses), "MMT-Based Media Transport Scheme in Digital Broadcasting Systems", ARIB STD-B60 Version 1.13, Oct. 11, 2018, pp.
ATSC (Advanced Television Systems Committee), "ATSC Candidate Standard: Signaling, Delivery, Synchronization, and Error Protection (A/331)", S33-174r3, Jun. 21, 2016, pp. 1-134.
Okazawa, Haruo, "Mistery of leap second, Change of 1-second", Electronics life, Japan Broadcast Publishing Co., Ltd., Jan. 1988, pp. 137-139.

* cited by examiner

| REFERENCE TIME (T) | ELAPSED TIME (T-T2) | CORRECTED ELAPSED TIME (dT) | CORRECTED SYSTEM TIME (T') |
|---|---|---|---|
| 08:58:21 (=T2) | 0 | 0 | 08:58:21.000 |
| 08:58:22 | 1 | 0.99 | 08:58:21.990 |
| 08:58:23 | 2 | 1.98 | 08:58:22.980 |
| .. | .. | .. | .. |
| 08:59:00 | 39 | 38.61 | 08:58:59.610 |
| 08:59:01 | 40 | 39.60 | 08:59:00.600 |
| .. | .. | .. | .. |
| 08:59:58 | 97 | 96.03 | 08:59:57.030 |
| 08:59:59 (1st) | 98 | 97.02 | 08:59:58.020 |
| 08:59:59 (2nd) | 99 | 98.01 | 08:59:59.010 |
| 09:00:00 (=T1) | | | 09:00:00.000 |

LEAP SECOND INSERTION ⟶

Fig. 4

| REFERENCE TIME (T) | ELAPSED TIME (T-T2) | CORRECTED ELAPSED TIME (dT) | CORRECTED SYSTEM TIME (T') |
|---|---|---|---|
| 08:58:19 (=T2) | 0 | 0 | 08:58:19.000 |
| 08:58:20 | 1 | 1.01 | 08:58:20.010 |
| 08:58:21 | 2 | 2.02 | 08:58:21.020 |
| .. | .. | .. | .. |
| 08:58:59 | 40 | 40.40 | 08:58:59.400 |
| 08:59:00 | 41 | 41.41 | 08:59:00.410 |
| .. | .. | .. | .. |
| 08:59:57 | 98 | 98.98 | 08:59:57.980 |
| 08:59:58 | 99 | 99.99 | 08:59:58.990 |
| 08:59:59 | - | - | - |
| 09:00:00 (=T1) | | | 09:00:00.000 |

LEAP SECOND DELETION

Fig. 6

BROADCASTING CONTROL APPARATUS, BROADCASTING CONTROL METHOD, PROGRAM, AND RECORDING MEDIUM

This application is a National Stage Entry of PCT/JP2020/010831 filed on Mar. 12, 2020, which claims priority from Japanese Patent Application 2019-053031 filed on Mar. 20, 2019, the contents of all of which are incorporated herein by reference, in their entirety.

BACKGROUND

Technical Field

The present disclosure relates to a broadcasting control apparatus, a broadcasting control method, a program, and a recording medium.

Background Art

In general, a broadcasting organization broadcasts a television program in reference to a time based on the Universal Coordinated Time (UTC). The Universal Coordinated Time has a rate the same as the International Atomic Time (TAI), but has an offset in units of seconds with respect to the International Atomic Time to absorb fluctuations in the length of day depending on fluctuations in the rotational speed of the earth. At the time in February 2019, the Universal Coordinated Time is later than the International Atomic Time by 37 seconds. This delay is caused by accumulation of leap second insertion in the past.

The broadcasting organization uses a predetermined time protocol to maintain an accuracy of time referenced by broadcasting equipment in a broadcasting station. For example, the Network Time Protocol (NTP) is an example of such a time protocol. An NTP client as the broadcasting equipment is synchronized with Universal Coordinated Time as a reference time, based on a time stamp described in an NTP packet delivered from an NTP server. The Precision Time Protocol (PTP) is another example of a time protocol. The NTP can achieve synchronization accuracy in the order of milliseconds between a server and a client, whereas the PTP can achieve synchronization accuracy in the order of microseconds.

When leap second adjustment (insertion or deletion of a leap second) is executed in the Universal Coordinated Time, an NTP or PTP server delivers leap second adjustment information to a client prior to a time when a leap second is scheduled to be actually inserted or deleted (for example, see NPL 1 and NPL 2). How to deal with the leap second by equipment receiving the leap second adjustment information depends on individual equipment implementation.

For example, PTL 1 discloses a technique in which a gap of a time of equipment relative to a reference time is checked at a scheduled time of the leap second adjustment to correct the time of the equipment. PTL 2 discloses a technique in which in a time signal system, a time signal is output at a timing near the leap second adjustment temporarily based on a free-running time rather than a reference time. PTL 3 discloses a technique in which a free-running mode is temporarily is used when the leap second adjustment is performed so that receiving equipment does not mistake a timing at which to process a video or sound. PTL 4 discloses a technique in which time display is corrected to be continuously incremented for two seconds for which the time display otherwise be duplicated due to the leap second insertion.

CITATION LIST

Non Patent Literature

[NPL 1] Association of Radio Industries and Businesses, "MMT-BASED MEDIA TRANSPORT SCHEME IN DIGITAL BROADCASTING SYSTEMS, ARIB STD-B60 Version 1.13, Oct. 11, 2018", [searched on Feb. 15, 2019], Internet <URL: http://www.arib.orjp/english/html/overview/doc/6-STD-B60v1_13-E1.pdf>

[NPL 2] Advanced Television Systems Committee, "ATSC Candidate Standard: Signaling, Delivery, Synchronization, and Error Protection (A/331)", [searched on Feb. 15, 2019], Internet <UREhttps://www.atsc.org/wp-content/uploads/2016/01/A331533-174r6-Signaling-Delivery-Sync-FEC.pdf>

PATENT LITERATURE

[PTL 1] JP 2015-059851 A
[PTL 2] JP 2016-054437 A
[PTL 3] JP 6264501 B
[PTL 4] JP 2010-272071 A

SUMMARY

Technical Problem

Leap second insertion is performed in the Japan Standard Time (JST) by displaying "8:59:59 am" again after 8:59:59 am. However, in this case, a displayed time is to turn back to the past at the start of the second 8:59:59 am. For this reason, use of the reference time adjusted in this scheme without change is problematic in an application in which a sequence order of time is not permitted to be broken. On the other hand, leap second deletion is performed in the Japan Standard Time by skipping one second of 8:59:59 am after 8:59:58 am to be progressed to 9:00:00 am. However, in this case, an event set to occur with 8:59:59 am as a trigger may fail to be triggered.

Technique disclosed in PTL 4 is one solution, particularly, for the turn back of time at the time of inserting the leap second, but time correction for a short period of time of two seconds significantly distorts the time progress. For this reason, the technique disclosed in PTL 4 is not suitable for an application in broadcast signal processing in which stable processing is required.

Accordingly, it is desirable to provide a scheme capable of more stably processing a broadcast signal in a case in which leap second adjustment is performed.

Solution to Problem

According to an example aspect, a broadcasting control apparatus is provided which includes: a time generating unit configured to generate a system time for broadcasting control, the system time being synchronized with a reference time in accordance with a predetermined time protocol; and a correction unit configured to, when leap second adjustment information indicating that leap second adjustment is scheduled to be completed at a first time in the reference time is received, correct the system time by a correction amount depending on a time length D over a correction period having the time length D from a second time earlier than the first time. The time length D is set such that a correction amount per second of the system time is equal to or less than a cycle corresponding to an inverse of a video frame rate.

According to another example aspect, a broadcasting control method is provided which includes: generating a system time for broadcasting control, the system time being synchronized with a reference time in accordance with a predetermined time protocol; and correcting, when leap second adjustment information indicating that leap second adjustment is scheduled to be completed at a first time in the reference time is received, the system time by a correction amount depending on a time length D over a correction period having the time length D from a second time earlier than the first time. The time length D is set such that a correction amount per second of the system time is equal to or less than a cycle corresponding to an inverse of a video frame rate.

According to still another example aspect, a computer program causing a processor to execute the above broadcasting control method may be provided. A non-transitory computer-readable recording medium storing the computer program may be provided.

Advantageous Effects of Invention

According to the technique of the present disclosure, it is possible to more stably process a broadcast signal in a case in which leap second adjustment is performed. Note that, according to the technique of the present disclosure, instead of or together with the above effects, other effects may be exerted.

BRIEF DESCRIPTION OF THE DRAWINGS

FIG. 4 is a table illustrating progress of a reference time and corrected system time in more detail when a leap second is inserted in the first Example;

FIG. 6 is a table illustrating progress of the reference time and corrected system time in more detail when a leap second is deleted in the first Example;

DESCRIPTION OF THE EXAMPLE EMBODIMENTS

Figure 1:
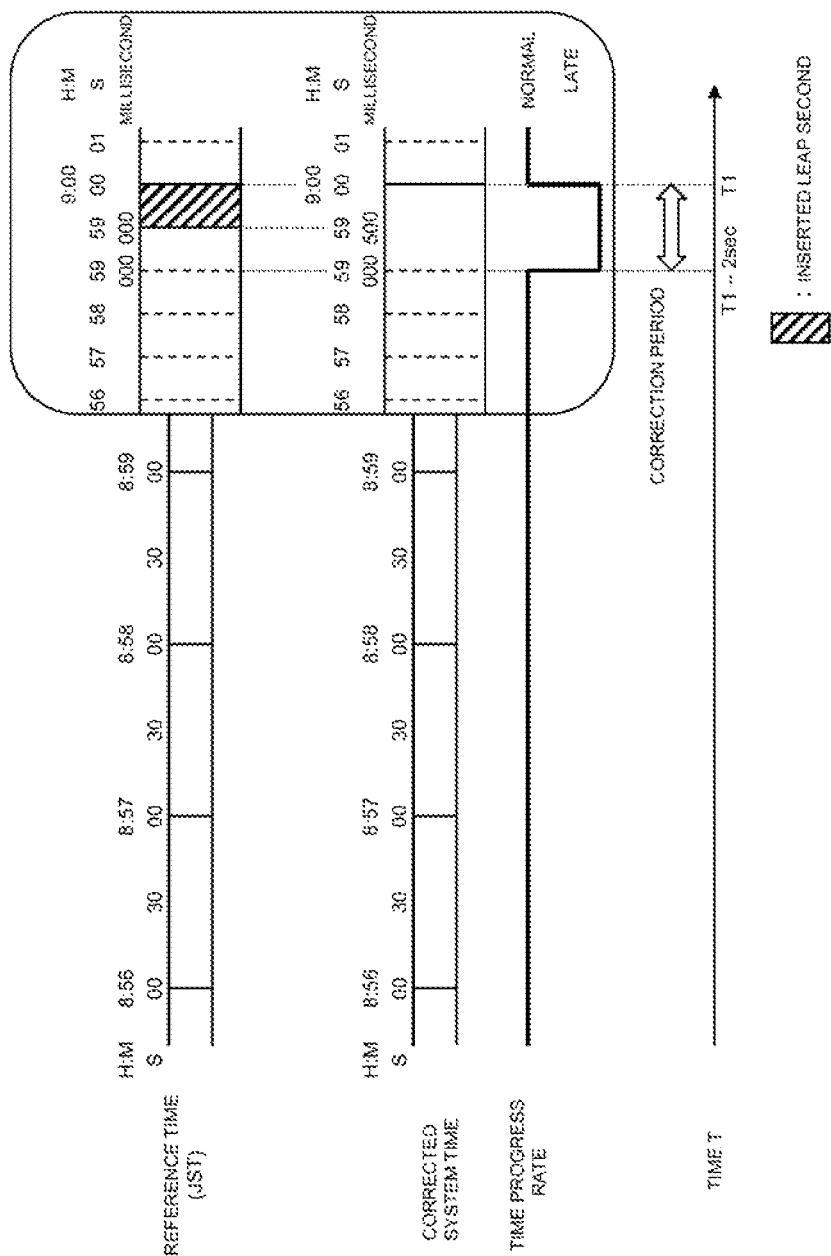
FIG. 1 is an explanatory diagram for illustrating an example of an existing scheme to correct time display to be continuously incremented when a leap second is inserted.

Hereinafter, example embodiments according to the technique of the present disclosure will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview
1-1. Related Art
1-2. Issues
2. First Example Embodiment
2-1. Configuration Example of Broadcasting Control Apparatus
2-2. Time Correction-Related Information
2-3. Flow of Processing
2-4. Example Alterations
3. Second Example Embodiment
4. Supplement 1. Overview 1-1. Related Art In general, a broadcasting organization broadcasts a television program in reference to a time based on the Universal Coordinated Time (UTC). As an example, an Automatic Program control System (APS) instructs equipment concerned to start broadcast of a television program at a timing when a time specified by a schedule of the television program arrives in the Universal Time Coordinated. The Universal Coordinated Time has a rate the same as the International Atomic Time (TAI), but has an offset in units of seconds with respect to the International Atomic Time to absorb fluctuations in the length of day depending on fluctuations in the rotational speed of the earth. At the time in February 2019, the Universal Coordinated Time is later than the International Atomic Time by 37 seconds. This delay is caused by accumulation of leap second insertion in the past.

The broadcasting organization uses a predetermined time protocol to maintain an accuracy of time referenced by broadcasting equipment in a broadcasting station. For example, the Network Time Protocol (NTP) is an example of such a time protocol. An NTP client as broadcasting equipment is synchronized with Universal Coordinated Time as a reference time, based on a time stamp described in an NTP packet delivered from an NTP server. The Precision Time Protocol (PTP) is another example of a time protocol. The NTP can achieve synchronization accuracy in the order of milliseconds between a server and a client, whereas the PTP can achieve synchronization accuracy in the order of microseconds.

When leap second adjustment (insertion or deletion of a leap second) is executed in the Universal Coordinated Time, an NTP or PTP server delivers leap second adjustment information to a client prior to a time when a leap second is scheduled to be actually inserted or deleted. For example, Table 1 below illustrates a data structure of time information in the NTP.

TABLE 1

Data structure of time information in NTP
(From NPL 1, Table 3-1 Configuration of NTP format)

| Data structure | Number of bits | Data notation |
|---|---|---|
| Network_Time_Protocol_Data ( ) { | | |
| leap_indicator | 2 | uimsbl |
| version | 3 | uimsbl |
| mode | 3 | uimsbl |
| stratum | 8 | uimsbl |
| poll | 8 | simsbl |
| precision | 8 | simsbl |
| root_delay | 32 | uimsbl |
| root_dispersion | 32 | uimsbl |
| reference_identification | 32 | uimsbl |
| reference_timestamp | 64 | uimsbl |
| origin_timestamp | 64 | uimsbl |
| receive_timestamp | 64 | uimsbl |
| transmit_timestamp | 64 | uimsbl |
| } | | |

The leap second adjustment is performed generally by duplicately inserting or deleting the last second on the last day of December or June in the Universal Time Coordinated (and may be performed also on the last day of March or September in a case in which the adjustment is not suit for change in the rotational speed of the earth). A parameter leap_indicator listed first in the data structure illustrated in Table 1 indicates a value identifying whether a leap second is inserted or a leap second is deleted in accordance with definition described in a table below, from the beginning of a month in which the leap second adjustment is performed until the leap second adjustment ends.

TABLE 2

Definition of leap_indicator (From
NPL 2, Table 3-2 Leap indicator)

| Leap indicator | meaning |
|---|---|
| 0 | Without alarm |
| 1 | Last one minute is 61 seconds |
| 2 | Last one minute is 59 seconds |
| 3 | Alarm |

In accordance with Table 2, for a month in which the leap second adjustment is not performed, leap_indicator indicates "0". For a month in which the leap second adjustment is performed, until the leap second adjustment ends, leap_indicator indicates "1" in a case of the leap second insertion, and indicates "2" in the case of the leap second deletion. Note that the Japan Standard Time is nine hours ahead of the Universal Time Coordinated, and thus, the timing of the leap second adjustment in Japan is generally immediately before nine o'clock am on January 1 or nine o'clock am on July 1, and leap_indicator indicates "1" or "2" from the month prior to the timing.

Table 3 below shows an example of time information in the PTP. In the PTP, two flags of leap59 and leap61 are the leap second adjustment information.

TABLE 3

Example of time information in PTP
(From NPL 2, Table 6.7 SystemTime Element Structure)

| Element or Attribute Name | Use | Data Type |
|---|---|---|
| System Time | 1 | |
| @currentUtcOffset | 1 | unsignedByte |
| @ptpPrepend | 0 . . . 1 | unsignedShort |
| @leap59 | 0 . . . 1 | boolean |
| @leap61 | 0 . . . 1 | boolean |
| @utcLocalOffset | 1 | duration |
| @dsStatus | 0 . . . 1 | boolean |
| @dsDayOfMonth | 0 . . . 1 | unsignedByte (range 1 . . . 31) |
| @dsHour | 0 . . . 1 | unsignedByte (range 0 . . . 24) |

The flag leap59 indicates a value of "1" to indicate that the leap second deletion is performed for a period from a day before the leap second adjustment timing to the leap second adjustment timing. The flag leap61 indicates a value of "1" to indicate that the leap second insertion is performed for a period from a day before the leap second adjustment timing to the leap second adjustment timing. When the leap second adjustment ends, the values of these flags are changed back to predefined values of "0".

Note that in the PTP, a value of a parameter currentUtcOffset representing a difference between the International Atomic Time and Universal Time Coordinated is changed through the leap second adjustment. A parameter utcLocalOffset represents a time difference between the Universal Time Coordinated and a local time zone where the system locates.

How to deal with the leap second by equipment receiving the leap second adjustment information described above depends on individual equipment implementation.

Here, in a situation in which a sequence order of time written into data is critical, for example, an e-commerce (e.g., a financial transaction such as buying and selling of stocks), the time display is not permitted to be duplicated (turn back to a second before) due to the leap second insertion. As such, PTL 4 discloses a technique in which time display is corrected to be continuously incremented for two seconds for which the time display otherwise be duplicated due to the leap second insertion.

FIG. 1 is an explanatory diagram for illustrating an example of an existing scheme disclosed in PTL 4. An upper row in FIG. 1 illustrates the Japan Standard Time (JST) as a reference time in a range from 8:56:00 am to 9:00:01 am. The time progresses from left to right. In the figure, oblique hatching represents a leap second to be inserted. In the example in FIG. 1, the leap second is inserted immediately before a time T1=9:00:00 am (JST). In other words, the second 8:59:59 am is inserted after the first 8:59:59 am.

A middle row in FIG. 1 represents a corrected system time in the same time range. According to the technique disclosed in PTL 4, an apparent time progress rate is reduced to a half, from two seconds before the time T1 to the time T1. With this operation, the corrected system time does not have the second 8:59:59 am, and the corrected system time indicates 8:59:59.500 am at a timing when the reference time indicates the second 8:59:59.000 am, for example. As a result of such a correction, display of the corrected system time does not turn back and continuously increases, so the sequence order of time may be ensured.

1-2. Issues

The existing scheme described above is one solution, particularly, for the turn back of time at the time of inserting the leap second, but time correction for a short period of time of two seconds significantly distorts the time progress. Specifically, in the example in FIG. 1, between before and after 8:59:00 am corresponding to two seconds before the time T1, and between before and after 9:00:00 am corresponding to the time T1, the time progress rates precipitously change (half and twice, respectively). Such a precipitously change is not suitable for an application in broadcast signal processing in which stable processing is required. The reason is that the broadcast signal processing is essentially based on periodic signal processing.

In addition, the technique disclosed in PTL 4 is not applicable to the case of the leap second deletion. In the case of the leap second deletion, the Japan Standard Time does not have a second of 8:59:59 am. For this reason, in a case that no measures are taken for the leap second deletion, an event set to occur with 8:59:59 am as a trigger (e.g., a start of broadcast of a video from 8:59:59) may fail to be triggered.

Then, a description will be given in the next and subsequent chapters in more detail of some example embodiments according to the technique of the present disclosure in order to enable more stably processing of a broadcast signal in a case in which leap second adjustment is performed.

2. First Example Embodiment

2-1. Configuration Example of Broadcasting Control Apparatus

Figure 2:
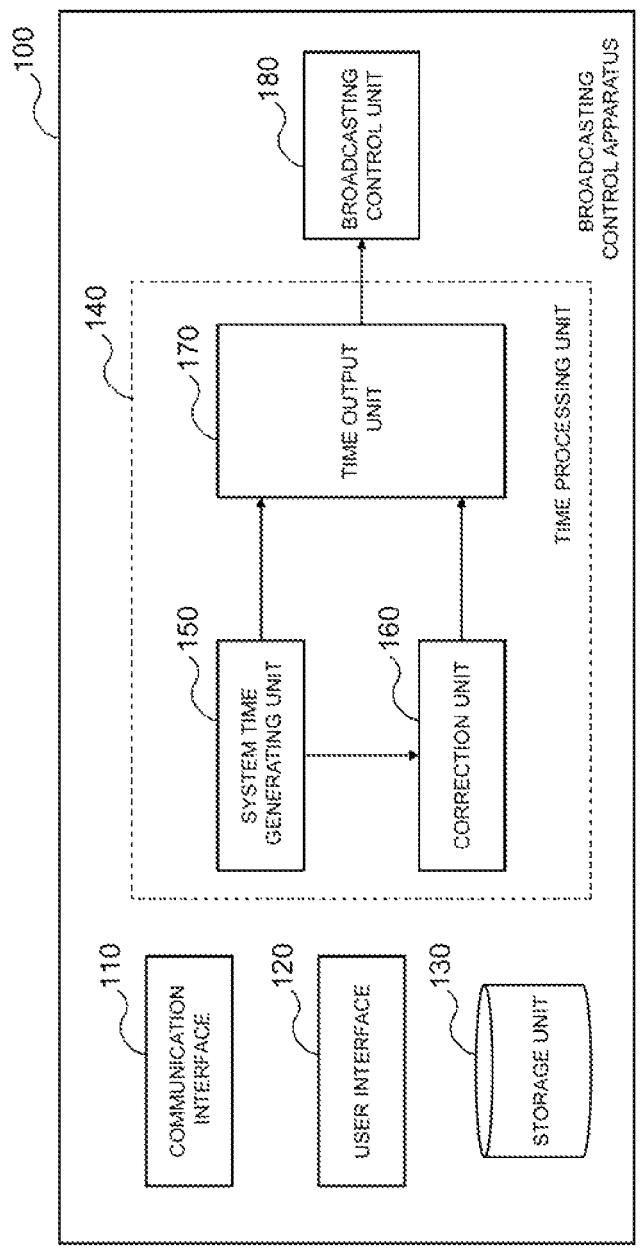
FIG. 2 is a block diagram illustrating an example of a configuration of a broadcasting control apparatus according to a first example embodiment.

FIG. 2 is a block diagram illustrating an example of a configuration of a broadcasting control apparatus 100 according to a first example embodiment. Here, the broadcasting control apparatus 100 is an APS connected to an IP network of a broadcasting station. Note that of course, the technique of the present disclosure may be applied to broadcasting equipment other than those of the APS. Another application example like this will be described later.

With reference to FIG. 2, the broadcasting control apparatus 100 includes a communication interface 110, a user interface 120, a storage unit 130, a time processing unit 140, and a broadcasting control unit 180. The time processing unit 140 includes a system time generating unit 150, a correction unit 160, and a time output unit 170.

(1) Communication Interface

The communication interface 110 is an interface for the broadcasting control apparatus 100 to communicate with another apparatus. The communication interface 110 may include a connection terminal and connection circuit for a wired communication, or may include an antenna, Radio Frequency (RF) circuit, and baseband circuit for a radio communication. In the present example embodiment, the communication interface 110 may be a network adapter or network card for a Local Area Network (LAN) communication, for example.

(2) User Interface

The user interface 120 may include an input device for receiving an instruction or information input from a user and an output device for outputting information. The input device may include one or more of a button, a switch, a keyboard, a keypad, a touch panel, and a pointing device, for example. The output device may include one or more of a display and a speaker, for example.

(3) Storage Unit

The storage unit 130 includes transitory and non-transitory computer-readable memories. The transitory memory may include a Random Access Memory (RAM), for example. The non-transitory memory may include one or more of a Read Only Memory (ROM), a Hard Disk Drive (HDD), and a Solid State Drive (SSD), for example. The storage unit 130 stores computer programs for implementing functionalities of the broadcasting control apparatus 100. Further, in the present example embodiment, the storage unit 130 stores broadcast schedule data describing a broadcast schedule of a predefined television program.

(4) System Time Generating Unit

The system time generating unit 150 generates a system time for broadcasting control, the system time being synchronized with a reference time in accordance with a predetermined time protocol. For example, the system time generating unit 150 may include a client module that operates in accordance with the predetermined time protocol.

As an example, the system time generating unit 150 may include an NTP client module. In this case, the system time generating unit 150 receives NTP messages from a plurality of NTP servers (not illustrated), and calculates a reference time with synchronization accuracy in the order of milliseconds, based on some of time stamps of those NTP messages that are estimated to have high accuracy. Then, the system time generating unit 150 outputs time information (e.g., time in the Universal Time Coordinated) indicating the calculated reference time to the correction unit 160 and the time output unit 170. The system time generating unit 150 outputs also leap second adjustment information (e.g., leap_indicator described above) received from the NTP servers to the correction unit 160.

As another example, the system time generating unit 150 may include a PTP slave module. In this case, the system time generating unit 150 exchanges PTP messages with a PTP grand master (not illustrated) synchronized with a highly accurate time source (e.g., a Global Navigation Satellite System (GNSS) satellite such as a Global Positioning System (GPS) satellite), and calculates the reference time with synchronization accuracy in the order of microseconds, based on the time stamps described in those messages. Then, the system time generating unit 150 outputs time information (e.g., time and offset in the International Atomic Time) indicating the calculated reference time to the correction unit 160 and the time output unit 170. The system time generating unit 150 outputs also leap second adjustment information (e.g., leap59 and leap61 described above) received from the PTP grand master to the correction unit 160.

(5) Correction Unit

The correction unit 160 monitors the leap second adjustment information input from the system time generating unit 150. Then, when the leap second adjustment information indicating that leap second adjustment is scheduled to be performed is input, the correction unit 160 corrects the system time during a predetermined period of time from a time enough earlier than a scheduled time of adjustment completion.

In a certain example, in a case in which the NTP is used as the time protocol, leap_indicator changes from "0" to "1" or "2" at a certain timing. This change indicates that the leap second adjustment is scheduled to be completed a month after the timing of this change. Additionally, the change of leap_indicator to "1" indicates that leap second is to be inserted a month after, and the change of leap_indicator to "2" indicates that a leap second is to be deleted a month after. In the Specification, the scheduled time of completion of the leap second adjustment indicated in this way by the leap second adjustment information is referred to as a first time T1. The system time generating unit 150, when detecting such a change in leap_indicator that is the leap second adjustment information, determines to correct the system time over a predetermined time length from a time (hereinafter, referred to as a second time T2) that is enough earlier than the first time T1.

In another example, in a case in which the PTP is used as the time protocol, any one of leap59 and leap61 changes from "0" to "1" at a certain timing. This change indicates that the leap second adjustment is scheduled to be completed a day after the timing of this change. Additionally, the change of leap59 to "1" indicates that leap second is to be deleted a day after, and the change of leap61 to "1" indicates that a leap second is to be inserted a day after. The system time generating unit 150, when detecting such a change in leap59 or leap61 that is the leap second adjustment information, determines to correct the system time over a predetermined time length from the second time T2 enough earlier than the first time T1.

The correction unit 160 temporarily changes an apparent time progress rate to correct the system time. In the Specification, a period of such temporary change is referred to as a correction period. In the present example embodiment, a time length D of the correction period is set such that a correction amount per second of the system time is equal to or less than a cycle corresponding to an inverse of a video frame rate. For example, in the field of broadcasting, the video frame rate of 60 Hz is widely used. An inverse of 60 Hz corresponds to 16.67 milliseconds. If insertion (deletion) of a second is performed to be dispersed in a correction period of 100 seconds, an absolute value of the correction amount per second is 1/100 second=10 milliseconds, which is smaller than 16.67 milliseconds and meets the condition of the time length D described above. A minimum value of the time length D of the correction period in the case of the video frame rate of 60 Hz is 60 (=1000/16.67) seconds.

The second time T2 that is a start time of the correction period may be a time earlier than the first time T1 by just the time length D or may be a time further earlier than the time. The correction unit 160 can set the second time T2 to a month before the first time T1 at the earliest in the case of using the NTP. The correction unit 160 can set the second time T2 to a day before the first time T1 at the earliest in the case of using the PTP. However, in a case in which a continuance, for a long time, of a state where the reference time differs from the corrected system time is not desirable, the second time T2 is preferably not to set an excessively early time.

The correction unit 160 corrects the system time input from the system time generating unit 150 by the correction amount depending on the time length D over the correction period having the time length D from the second time T2.

When a leap second is inserted in the system time, the correction unit 160 can determine a corrected system time T' as expressed by an equation below, where a current reference time is T and the corrected system time is T'.

[Math. 1]

$$T' = T2 + dT, \text{ where } dT = (T - T2) \cdot \frac{D-1}{D} \quad (1)$$

Equation (1) means that a corrected elapsed time dT is calculated by multiplying an elapsed time T-T2 since the second time T2 by a ratio (D—1)/D, and a sum obtained by adding the corrected elapsed time dT to the second time T2 is determined as the corrected system time T'. In a case of D=100, the ratio multiplied with the elapsed time T—T2 is equal to 0.99.

Figure 3:
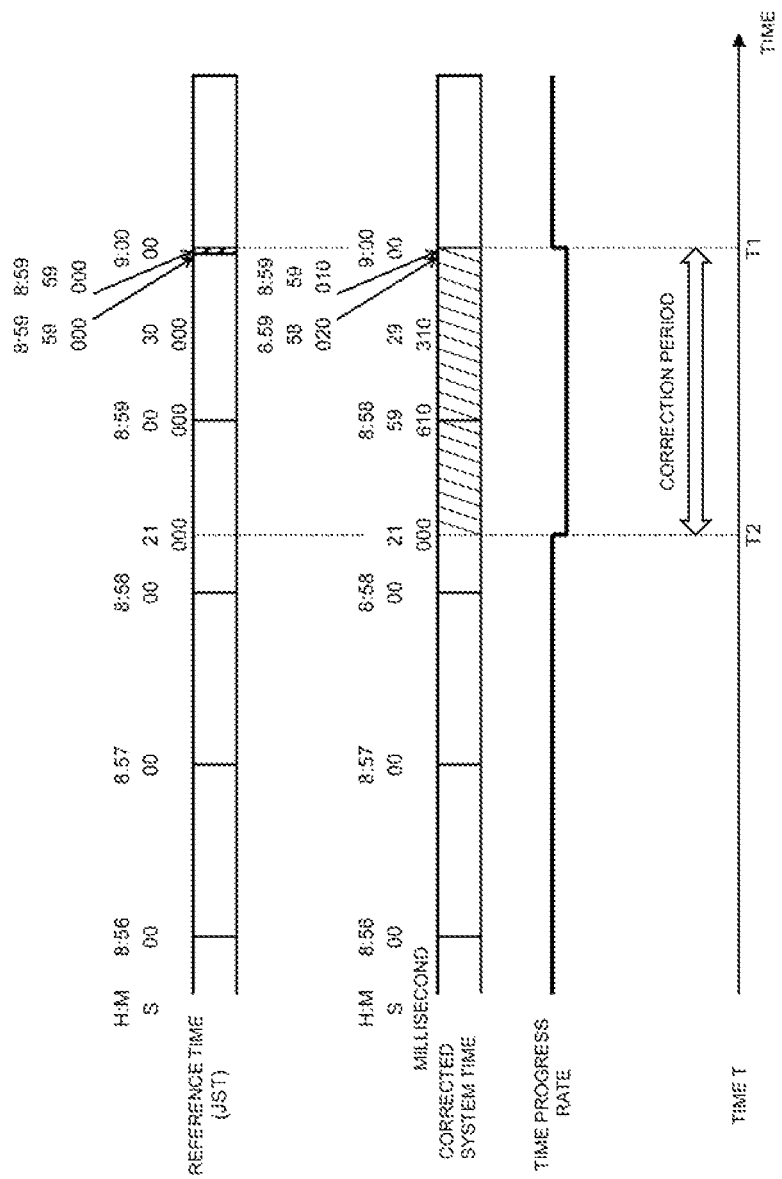
FIG. 3 is an explanatory diagram for schematically illustrating an example of time progress when a leap second is inserted in a first Example.

For example, in a first Example, assume that the second time T2 is a time earlier than the first time T1 by just the time length D, and D=100 seconds (in other words, T2=T1 −100 seconds). FIG. 3 is an explanatory diagram for schematically illustrating an example of time progress when a leap second is inserted in the first Example. An upper row in FIG. 3 illustrates the Japan Standard Time (JST) as a reference time in a range from 8:56:00 am to 9:00:00 am. In the example in FIG. 3, the leap second is inserted immediately before the time T1=9:00:00 am (JST).

A middle row in FIG. 3 represents a corrected system time in the same time range. The time T2 at which the correction is started is 8:58:21 am. At the time T2, there is no difference between the reference time and the corrected system time.

At a time when 39 seconds elapse since the time T2, the reference time indicates 8:59:00.000 am, whereas the corrected system time indicates 8:58:59.610 am (in other words, 39/100 second later than the reference time).

At a time when 69 seconds elapse since the time T2, the reference time indicates 8:59:30.000 am, whereas the corrected system time indicates 8:59:29.310 am (in other words, 69/100 second later than the reference time).

At a time when 98 seconds elapse since the time T2, the reference time indicates the first 8:59:59.000 am, whereas the corrected system time indicates 8:59:58.020 am (in other words, 98/100 second later than the reference time).

At a time when 99 seconds elapse since the time T2, the reference time indicates the second 8:59:59.000 am due to the leap second insertion, whereas the corrected system time indicates 8:59:59.010 am. In other words, the reference time turns back at this timing by a second to the past, whereas the corrected system time does not turn back.

Then, at the time T1 when 100 seconds elapse since the time T2, the reference time indicates 9:00:00.000 am, and the leap second adjustment ends. At this time, the corrected system time also indicates 9:00:00.000 am, and the correction period ends.

Here, comparing the existing scheme described using FIG. 1 with the Example, at the time when the reference time indicates the first 8:59:59.000 am, the corrected system time in the existing scheme is 8:59:59.000 am, whereas the corrected system time in the Example is 8:59:58.020 am. At the time when the reference time indicates the second 8:59:59.000 am, the corrected system time in the existing scheme is 8:59:59.500 am, whereas the corrected system time in the Example is 8:59:59.010 am. In other words, between these two times, only 0.5 second apparently elapses in the existing scheme, whereas 0.99 second apparently elapses in the Example. In this manner, the apparent elapsed time in the existing scheme deviates 50% from an actual elapsed time, whereas the apparent elapsed time in the Example deviates only 1% from the actual elapsed time. The same holds for the elapsed time from the time at which the reference time indicates the second 8:59:59.000 am until the time of 9:00:00.000 am at which the leap second adjustment ends.

FIG. 4 illustrates transitions of the current time T (reference time) from the time T2 to the time T1, the elapsed time (T—T2), the corrected elapsed time (dT), and the corrected system time (T') in more detail when the leap second is inserted in the first Example described above.

When a leap second is deleted from the system time, the correction unit 160 can determine the corrected system time T' as expressed by an equation below.

[Math. 2]

$$T' = T2 + dT, \text{ where } dT = (T - T2) \cdot \frac{D+1}{D} \quad (2)$$

Equation (2) means that the corrected elapsed time dT is calculated by multiplying the elapsed time T—T2 since the second time T2 by a ratio (D+1)/D, and a sum obtained by adding the corrected elapsed time dT to the second time T2 is determined as the corrected system time T'. In a case of D=100, the ratio multiplied with the elapsed time T—T2 is equal to 1.01.

Figure 5:
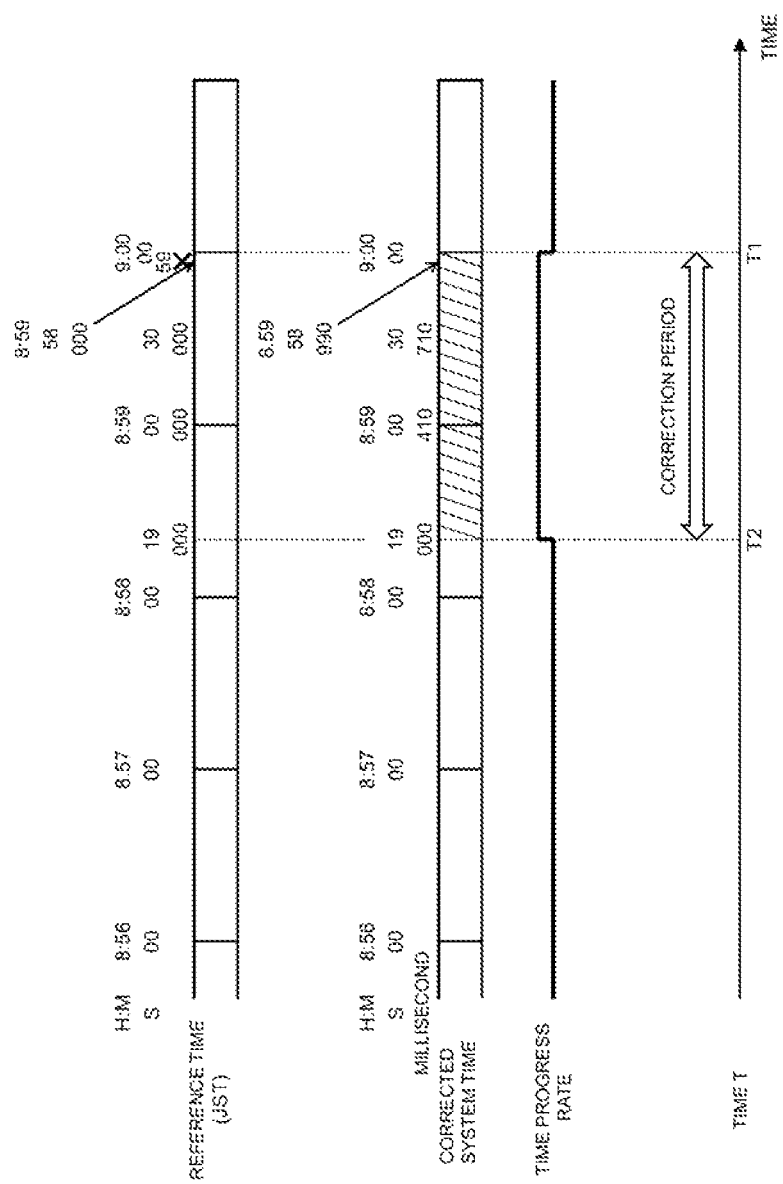
FIG. 5 is an explanatory diagram for schematically illustrating an example of time progress when a leap second is deleted in the first Example.

FIG. 5 is an explanatory diagram for schematically illustrating an example of a time progress when a leap second is deleted in the first Example. An upper row in FIG. 5 illustrates the Japan Standard Time (JST) as a reference time in a range from 8:56:00 am to 9:00:00 am. In the example in FIG. 5, the leap second is deleted immediately before the time T1=9:00:00 am (JST).

A middle row in FIG. 5 represents a corrected system time in the same time range. The time T2 at which the correction is started is 8:58:19 am. At the time T2, there is no difference between the reference time and the corrected system time.

At a time when 41 seconds elapse since the time T2, the reference time indicates 8:59:00.000 am, whereas the corrected system time indicates 8:59:00.410 am (in other words, 41/100 second ahead of the reference time).

At a time when 71 seconds elapse since the time T2, the reference time indicates 8:59:30.000 am, whereas the corrected system time indicates 8:59:30.710 am (in other words, 71/100 second ahead of the reference time).

At a time when 99 seconds elapse since the time T2, the reference time indicates 8:59:58.000 am, whereas the corrected system time indicates 8:59:58.990 am (in other words, 99/100 second ahead of the reference time).

At a time when 100 seconds elapse since the time T2, the reference time skips 8:59:59 am due to the leap second deletion to indicate 9:00:00.000 am. Then, the leap second adjustment ends. At this time, the corrected system time also indicates 9:00:00.000 am, and the correction period ends.

Here, the actual elapsed time from the time at which the reference time indicates 8:59:58.000 am until the leap second adjustment ends is a second, whereas the corrected system time in the Example apparently elapses by 1.01 second from 8:59:58.990 am to 9:00:00.000 am. In this manner, in the Example, when the leap second is deleted also, the apparent elapsed time deviates only 1% from the apparent elapsed time.

FIG. 6 illustrates transitions of the current time T (reference time) from the time T2 to the time T1, the elapsed time (T—T2), the corrected elapsed time (dT), and the corrected system time (T') in more detail when the leap second is deleted in the first Example described above.

The correction of the system time by the correction unit 160 may be performed in accordance with Equation (3) below, when a leap second is inserted in the reference time. However, Equation (3) is substantially equivalent to Equation (1).

[Math. 3]

$$T' = T - dT, \text{ where } dT = (T - T2) \cdot \frac{1}{D} \quad (3)$$

Equation (3) means that the corrected system time T' is determined by subtracting from the reference time T the correction amount dt corresponding to a quotient obtained by dividing the elapsed time T—T2 since the second time T2 by the time length D. In a case of D=100, the correction amount per second dt is equal to 0.01 second. However, note that in the case of Equation (3), during a second for which the reference time T indicates the second X:59:59 (X depending on the time zone), T is to be substituted by X:59:60 and the correction amount dt is to be subtracted.

The correction of the system time by the correction unit 160 may be performed in accordance with Equation (4) below, when a leap second is deleted from the reference time. However, Equation (4) is substantially equivalent to Equation (2).

[Math. 4]

$$T' = T + dT, \text{ where } dT = (T - T2) \cdot \frac{1}{D} \quad (4)$$

Equation (4) means that the corrected system time T' is determined by adding to the reference time T the correction amount dt corresponding to a quotient obtained by dividing the elapsed time T—T2 since the second time T2 by the time length D. In a case of D=100, the correction amount per second dt is equal to 0.01 second.

In the first Example, it is assumed that the correction period ends at the first time T1 at which the leap second adjustment for the reference time ends. However, the correction period may end at a third time T3 that is earlier than the first time T1.

Figure 7:
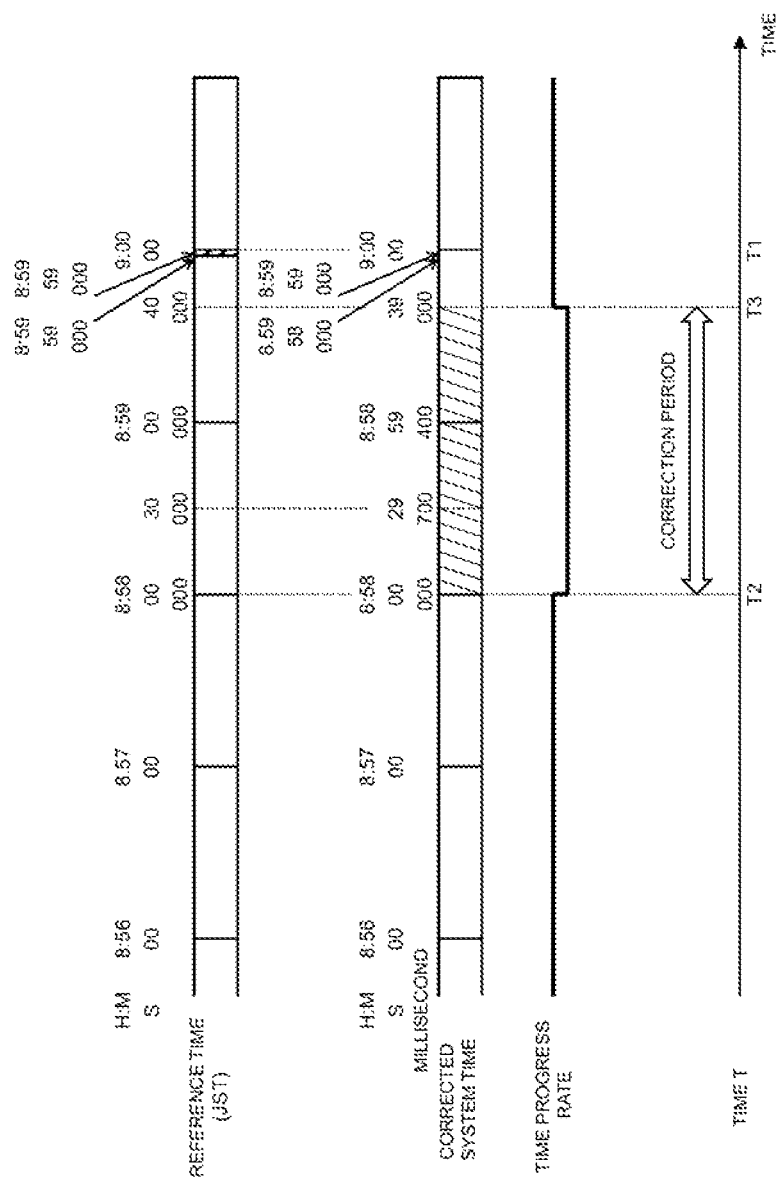
FIG. 7 is an explanatory diagram for schematically illustrating an example of time progress when a leap second is inserted in a second Example.

For example, in a second Example, assume that the second time T2 is a time earlier than the first time T1 by two minutes, where the time length D of the correction period is 100 seconds similar to the first Example. FIG. 7 is an explanatory diagram for schematically illustrating an example of time progress when a leap second is inserted in the second Example. In the example also, the leap second is inserted immediately before the time T1=9:00:00 am (JST).

The time T2 at which the correction is started is 8:58:00 am. At the time T2, there is no difference between the reference time and the corrected system time.

At a time when 30 seconds elapse since the time T2, the reference time indicates 8:58:30.000 am, whereas the corrected system time indicates 8:58:29.700 am (in other words, 30/100 second later than the reference time).

At a time when 60 seconds elapse since the time T2, the reference time indicates 8:59:00.000 am, whereas the corrected system time indicates 8:58:59.400 am (in other words, 60/100 second later than the reference time).

At a time when 100 seconds elapse since the time T2, the reference time indicates 8:59:40.000 am, whereas the corrected system time indicates 8:59:39.000 am (in other words, a second later than the reference time). This timing matches the third time T3 that is an ending time of the correction period, so the correction period ends. The correction unit 160 keeps the time progress rate to be the same as the reference time from the end of the correction period to the first time T1.

At a time when the reference time reaches the first 8:59:59.000 am, the corrected system time indicates 8:59:58.000 am. After further a second elapses, the reference time indicates the second 8:59:59.000 am due to the leap second insertion, whereas the corrected system time indicates 8:59:59.000 am. In other words, the reference time turns back at this timing by a second to the past, whereas the corrected system time does not turn back.

Then, at the time T1, the reference time and corrected system time indicate 9:00:00.000 am, and the leap second adjustment ends.

In the example in FIG. 7 also, an apparent elapsed time between any two times during the correction period deviates only 1% from the elapsed time in the reference time.

Figure 8:
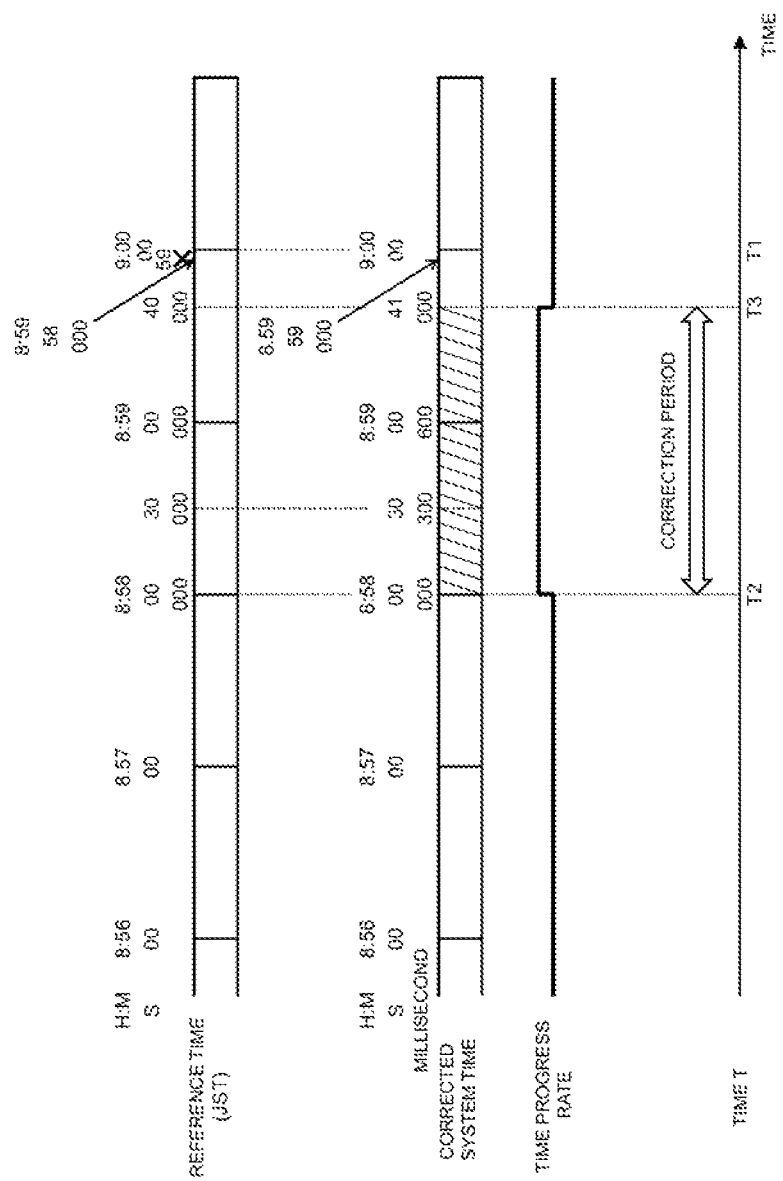
FIG. 8 is an explanatory diagram for schematically illustrating an example of time progress when a leap second is deleted in the second Example.

FIG. 8 is an explanatory diagram for schematically illustrating an example of time progress when a leap second is deleted in the second Example. In the example also, the leap second is deleted immediately before the time T1=9:00:00 am (JST).

The time T2 at which the correction is started is 8:58:00 am. At the time T2, there is no difference between the reference time and the corrected system time.

At a time when 30 seconds elapse since the time T2, the reference time indicates 8:58:30.000 am, whereas the corrected system time indicates 8:58:30.300 am (in other words, 30/100 second ahead of the reference time).

At a time when 60 seconds elapse since the time T2, the reference time indicates 8:59:00.000 am, whereas the corrected system time indicates 8:59:00.600 am (in other words, 60/100 second ahead of the reference time).

At a time when 100 seconds elapse since the time T2, the reference time indicates 8:59:40.000 am, whereas the corrected system time indicates 8:59:41.000 am (in other words, a second ahead of the reference time). This timing matches the third time T3 that is an ending time of the correction period, so the correction period ends. The correction unit 160 keeps the time progress rate to be the same as the reference time from the end of the correction period to the first time T1.

At a time when the reference time reaches 8:59:58 am, the corrected system time indicates 8:59:59.000 am. After further one second elapses, the reference time skips 8:59:59 am due to the leap second deletion to indicate 9:00:00.000 am. Then, the leap second adjustment ends. At this time, the corrected system time also indicates 9:00:00.000 am.

In the example in FIG. 8 also, an apparent elapsed time between any two times during the correction period deviates only 1% from the elapsed time in the reference time.

The correction unit 160 outputs corrected time information that indicates the corrected system time determined in accordance with the scheme described above to the time output unit 170. Alternatively, the correction unit 160 may output correction amount information indicating the correction amount of the system time (e.g., dt in Equation (3) or Equation (4)) to the time output unit 170.

(6) Time Output Unit

The time output unit 170 acquires the corrected time information indicating the corrected system time from the correction unit 160 from the second time T2 at which the correction period described above starts until the first time T1 at which the leap second adjustment ends. Alternatively, the correction amount information may be input from the correction unit 160 to the time output unit 170, and the time output unit 170 may add the correction amount indicated by the correction amount information to the system time based on the time information from the system time generating unit 150 (or subtracting from the system time) to calculate the corrected system time. Then, the time output unit 170 outputs the corrected system time to the broadcasting control unit 180.

The time output unit 170 outputs, during a period for which the system time is not corrected by the correction unit 160, the system time based on the time information input from the system time generating unit 150 to the broadcasting control unit 180. In the case in which the NTP is used as the time protocol, an uncorrected system time may be the Universal Time Coordinated, or a sum of the Universal Time Coordinated and the time difference depending on the time zone. In the case in which the PTP is used as the time protocol, the uncorrected system time may be a sum of the International Atomic Time, an accumulative offset of the leap second adjustment (currentUtcOffset in Table 3), and the time difference.

(7) Broadcasting Control Unit

The broadcasting control unit 180 refers to the system time input from the time processing unit 140 to control broadcast of a television program according to broadcast schedule data stored in the storage unit 130. For example, the broadcasting control unit 180 instructs equipment concerned to start broadcast of a television program at a timing when a broadcast start time of the television program indicated by the broadcast schedule data arrives. In the present example embodiment, the system time is corrected in a manner such that the sequence order of time is ensured. Therefore, even by what kind of time the control related to the broadcast is set to be triggered, the broadcasting control unit 180 can appropriately perform the control without losing the trigger.

In the present example embodiment, as described above, the time processing unit 140 corrects the system time in a manner such that the time progress rate moderately changes during a period for which the leap second adjustment is scheduled. Therefore, the equipment operating in response to the instruction from the broadcasting control unit 180 can stably process a broadcast signal without being disturbed in a timing of the operation.

2-2. Time Correction-Related Information

The time output unit 170 may transmit correction-related information that is related to the correction of the system time to another apparatus using the system time to be corrected via the communication interface 110.

For example, the correction-related information may include the corrected time information indicating the corrected system time. In this case, an apparatus receiving the correction-related information can stably process a broadcast signal in accordance with the corrected system time without requiring additional implementation.

For example, the correction-related information may include the correction amount information indicating the correction amount of the system time. Existing offset information (e.g., currentUtcOffset in Table 3) indicates an offset value only in second granularity, whereas the correction amount information desirably indicates the correction amount in millisecond granularity. In this case, an apparatus receiving the correction-related information can correct, by using the correction amount indicated by the correction amount information, a system time that the apparatus itself generates or acquires, and can stably process a broadcast signal in accordance with the corrected system time.

For example, the correction-related information may include a correct parameter that indicates one or more of the second time T2, the time length D, and the third time T3 at which the correction period ends. In this case, an apparatus receiving the correction-related information can perform the calculation for correcting the system time by itself similarly in the broadcasting control apparatus 100 to stably process a broadcast signal in accordance with a time synchronized with broadcasting control apparatus 100.

Note that the correction-related information described here may be received by a broadcasting control apparatus 200, 300, or 400 in example alterations described later.

2-3. Flow of Processing (1) Time Control Processing

Figure 9:
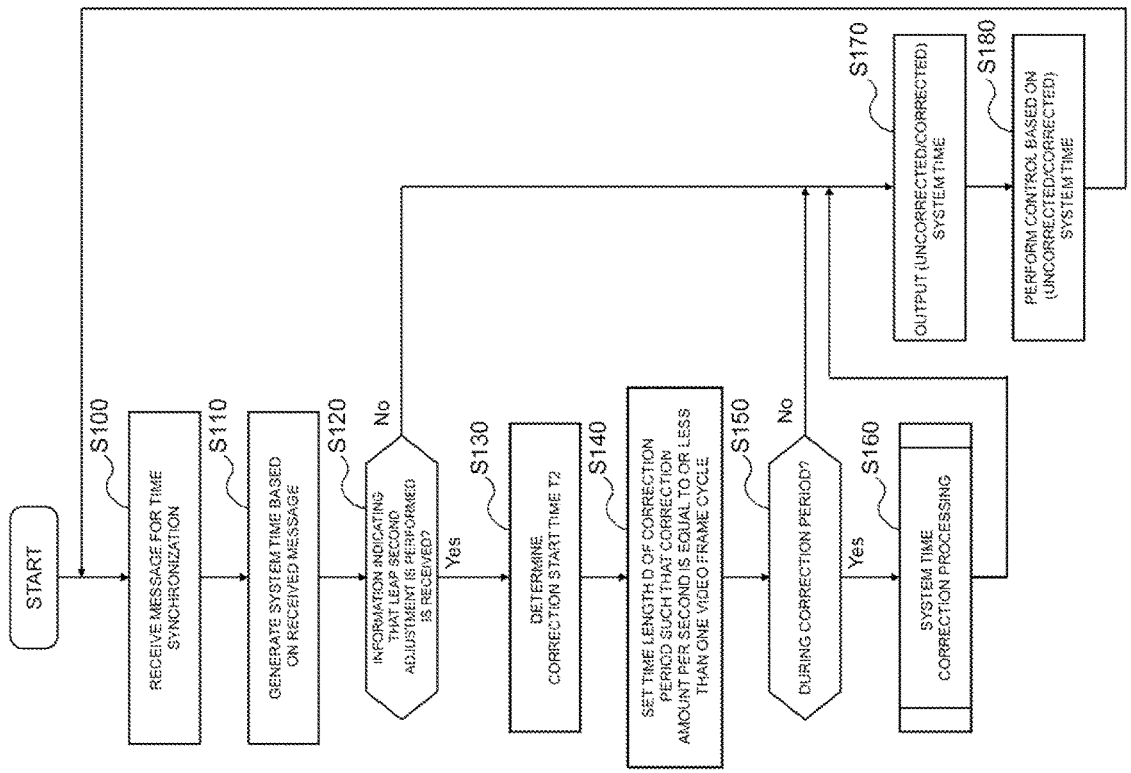
FIG. 9 is a flowchart illustrating an example of a flow of time control processing according to the first example embodiment.

FIG. 9 is a flowchart illustrating an example of a flow of time control processing according to the first example embodiment.

First, the system time generating unit 150 receives one or more messages for synchronizing a system time with a reference time in accordance with a predetermined time protocol (e.g., from the NTP server or the PTP grand master) via the communication interface 110 (step S100).

Next, the system time generating unit 150 generates a system time for broadcasting control, based on the received message (step S110). Processing after that branches depending on whether or not the leap second adjustment information is received, the leap second adjustment information indicating whether or not the leap second adjustment is performed (step S120). When the leap second adjustment information indicating that the leap second adjustment is performed is not received, the processes in step S130 to step S160 are skipped.

When the leap second adjustment information indicating that the leap second adjustment is performed is received, the correction unit 160 determines the second time T2 corresponding to a correction start time in reference to the first time T1 at which the leap second adjustment is scheduled to end (step S130). The correction unit 160 sets the time length D of the correction period such that a correction amount per second is equal to or less than one video frame cycle corresponding to an inverse of a video frame rate (step S140). Note that steps S130 and S140, after performed at the beginning of the first correction period, may not be performed again during the same correction period. The time length D may be fixedly set in advance, and in such a case, step S140 is omitted from the time control processing in FIG. 9.

After that, when the correction period starting at the second time T2 arrives (step S150), the correction unit 160 performs the system time correction processing to determine the corrected system time (step S160). The system time correction processing performed here will be described in more detail later.

Then, the time output unit 170 outputs, to the broadcasting control unit 180, the uncorrected system time T in a case in which the leap second adjustment is not performed. The time output unit 170 outputs, to the broadcasting control unit 180, the system time T' corrected by the correction unit 160 in a case in which the leap second adjustment is performed (step S170).

The broadcasting control unit 180 controls equipment in a system of the broadcasting station, based on the input (uncorrected or correct) system time (step S180).

The time control processing illustrated in FIG. 9 may be repeatedly performed while the system operates without stopping.

(2) System Time Correction Processing

Figure 10:
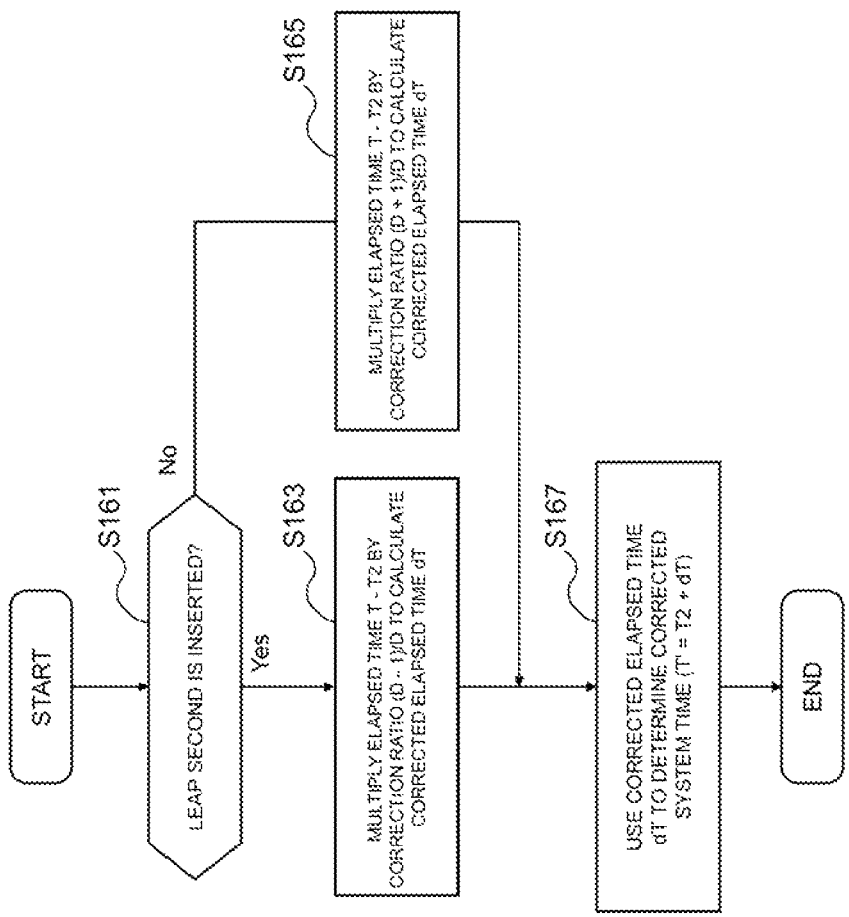
FIG. 10 is a flowchart illustrating an example of a detailed flow of system time correction processing included in the time control processing illustrated in FIG. 9.

FIG. 10 is a flowchart illustrating an example of a detailed flow of the system time correction processing included in the time control processing illustrated in FIG. 9. Here, as an example, assume that the system time is corrected in accordance with Equation (1) or Equation (2) described above.

First, the correction unit 160 determines whether a leap second is inserted or deleted based on the leap second adjustment information acquired by the system time generating unit 150 (step S161).

When a leap second is inserted, the correction unit 160 multiplies the elapsed time T-T2 since the start time of the correction period to the current time by a correction ratio (D−1)/D to calculate the corrected elapsed time dT (step S163). On the other hand, when a leap second is deleted, the correction unit 160 multiplies the elapsed time T—T2 since the start time of the correction period to the current time by a correction ratio (D+1)/D to calculate the corrected elapsed time dT (step S165).

Then, the correction unit 160 adds the corrected elapsed time dT to the start time T2 of the correction period to determine the corrected system time T' (step S167).

2-4. Example Alterations

In this chapter, the example in which the broadcasting control apparatus 100 is an APS has been mainly described. However, the technique of the present disclosure is not limited to such an example. For example, the technique of the present disclosure may be applied to a transmission node that transmits a broadcast signal stream. The technique of the present disclosure may be also applied to a reception node that receives a broadcast signal stream.

(1) First Example Alteration

Figure 11:
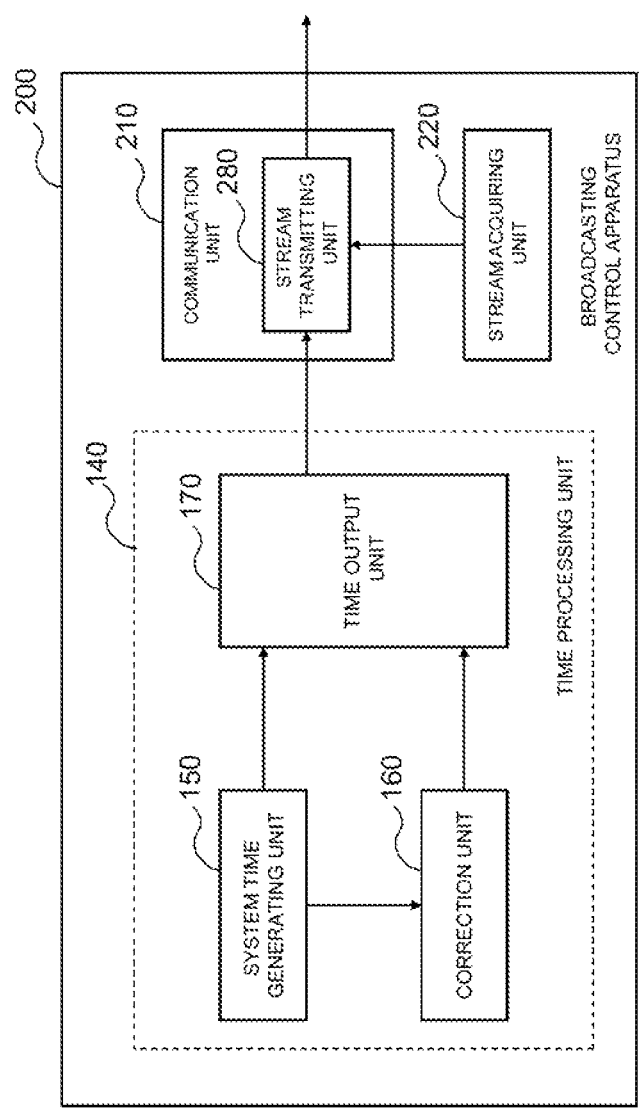
FIG. 11 is a block diagram illustrating an example of a configuration of a broadcasting control apparatus according to a first example alteration of the first example embodiment.

FIG. 11 is a block diagram illustrating an example of a configuration of a broadcasting control apparatus 200 according to a first example alteration. The broadcasting control apparatus 200 is a transmission node that transmits, for example, a broadcast signal stream (e.g., SMPTE ST2022-6 stream, SMPTE ST2110 stream or ARIB STD-B73 stream). With reference to FIG. 11, the broadcasting control apparatus 200 includes the time processing unit 140, a communication unit 210, and a stream acquiring unit 220.

The communication unit 210 is an interface for the broadcasting control apparatus 200 to communicate with another apparatus. The communication unit 210 may include a connection terminal and connection circuit for a wired communication, or may include an antenna, RF circuit, and baseband circuit for a radio communication. In the present example embodiment, the communication unit 210 includes a stream transmitting unit 280.

The stream acquiring unit 220 acquires a stream of broadcast signals to be transmitted from a signal source not illustrated. For example, the stream acquiring unit 220 may acquire a stream of captured video from a camera that is built in or connected to the broadcasting control apparatus 200. The stream acquiring unit 220 may acquire a stream of recorded broadcast signals from a storage inside or outside thereof that accumulates files recording the broadcast signals. The stream acquiring unit 220 outputs the acquired stream of broadcast signals to the stream transmitting unit 280.

The stream transmitting unit 280 inserts time information (also referred to as a time code) based on the system time input from the time processing unit 140 in the broadcast signal stream to be transmitted. The time information inserted here may be the corrected time information indicating the corrected system time determined by the correction unit 160 in the case in which the leap second adjustment is performed. The time information may be inserted into any position in a packet, such as an RTP header or an essence header in an RTP payload, for example. A format of the time information may be a time stamp format, or a format of a count value obtained by counting a time of epoch defined in SMPTE ST2059-1 with an initial value being zero. Then, the stream transmitting unit 280 transmits the broadcast signal stream in which the time information is inserted to the IP network of the broadcasting station.

(2) Second Example Alteration

Figure 12:
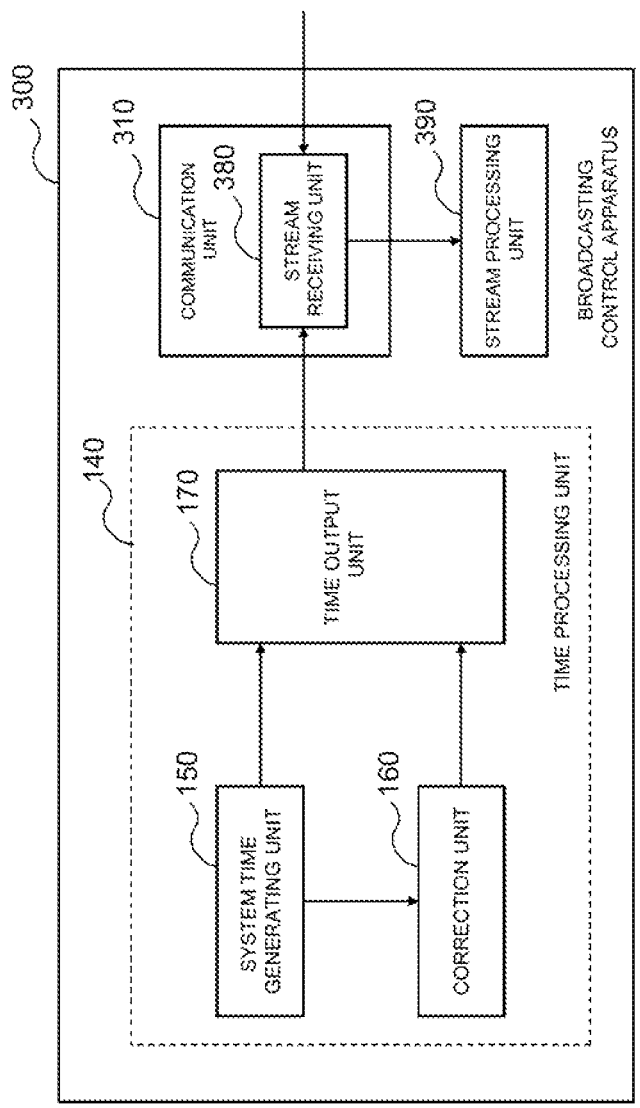
FIG. 12 is a block diagram illustrating an example of a configuration of a broadcasting control apparatus according to a second example alteration of the first example embodiment.

FIG. 12 is a block diagram illustrating an example of a configuration of a broadcasting control apparatus 300 according to a second example alteration. The broadcasting control apparatus 300 is a reception node that receives, for example, a broadcast signal stream. With reference to FIG. 12, the broadcasting control apparatus 300 includes the time processing unit 140, a communication unit 310, and a stream processing unit 390.

The communication unit 310 is an interface for the broadcasting control apparatus 300 to communicate with another apparatus. The communication unit 310 may include a connection terminal and connection circuit for a wired communication, or may include an antenna, RF circuit, and baseband circuit for a radio communication. In the present example embodiment, the communication unit 310 includes a stream receiving unit 380.

The stream receiving unit 380 receives the broadcast signal stream transmitted from a transmission node in the system of the broadcast station at a timing determined based on the system time input from the time processing unit 140. In a case in which the broadcast signal stream is a multicast stream, the stream receiving unit 380 can receive the broadcast signal stream by participating in a multicast group corresponding to the stream. The system time referred to by the stream receiving unit 380 may be the corrected system time determined by the correction unit 160 in the case in which the leap second adjustment is performed.

The stream processing unit 390 processes the broadcast signal stream received by the stream receiving unit 380. For example, the stream processing unit 390 may reproduce a video based on video data extracted from the received broadcast signal stream, or may reproduce an audio based on audio data extracted. Instead, the stream processing unit 390 may code the video data or the audio data to store the coded data in a storage unit not illustrated. The stream processing unit 390 may also convert a format of the received broadcast signal stream into another format, and transfer the converted stream via the communication unit 310 to another node.

(3) Third Example Alteration

Figure 13:
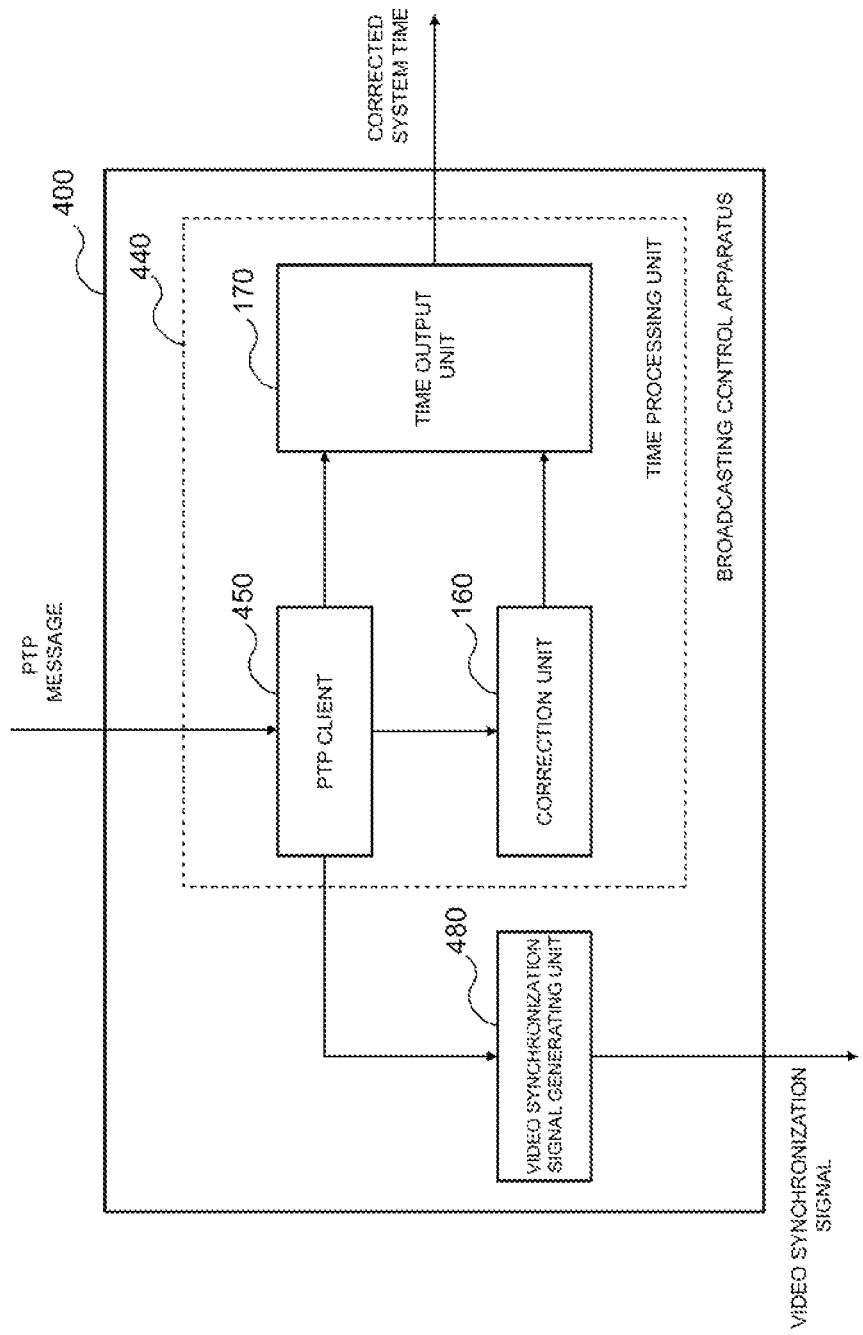
FIG. 13 is a block diagram illustrating an example of a configuration of a broadcasting control apparatus according to a third example alteration of the first example embodiment.

FIG. 13 is a block diagram illustrating an example of a configuration of a broadcasting control apparatus 400 according to a third example alteration. The broadcasting control apparatus 400 is a control node that, for example, delivers the time information into the system of the broadcasting station, and delivers a video synchronization signal regulating a frame timing of a video signal. With reference to FIG. 13, the broadcasting control apparatus 400 includes a time processing unit 440 and a video synchronization signal generating unit 480.

The time processing unit 440 includes a PTP client 450, the correction unit 160, and the time output unit 170.

The PTP client 450 is a PTP slave module that generates a system time for broadcasting control, the system time being synchronized with a reference time in accordance with the PTP. The PTP client 450 exchanges PTP messages with the PTP grand master (not illustrated), and calculates the reference time, based on the time stamps described in those messages. Then, the PTP client 450 outputs time information (e.g., time and offset in the International Atomic Time) indicating the calculated reference time to the correction unit 160 and the time output unit 170. The PTP client 450 outputs the leap second adjustment information (e.g., leap59 and leap61 described above) received from the PTP grand master to the correction unit 160. Further, in the example alteration, the PTP client 450 outputs TAI information indicating a time in the International Atomic Time (TAI) to the video synchronization signal generating unit 480.

The video synchronization signal generating unit 480 generates a video synchronization signal that repeats on/off in a certain cycle, based on a TAI clock on which the leap second adjustment and the correct by the correction unit 160 are not performed. Then, the video synchronization signal generating unit 480 delivers the generated video synchronization signal to one or more nodes in the system of the broadcasting station. The video synchronization signal here may be a so-called black burst signal. In this manner, the video synchronization signal, which is not affected by the time progress distortion generated due to the leap second adjustment, is generated separately from the correction of the system time, and thus, the moderate leap second adjustment is achieved, while the frame timing of the node existing in the system can be strictly kept constant.

3. Second Example Embodiment

Next, a second example embodiment will be described using FIG. 14. The above-described first example embodiment is a concrete example embodiment, whereas the second example embodiment is a more generalized example embodiment.

Figure 14:
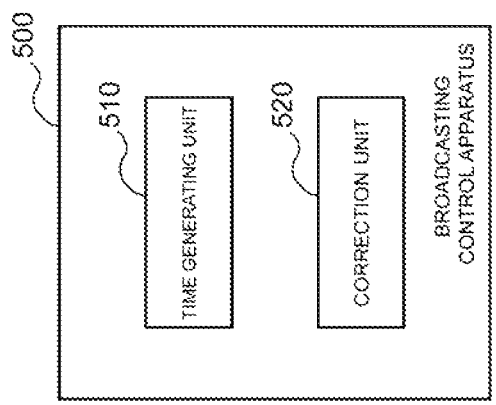
FIG. 14 is a block diagram illustrating an example of a configuration of a broadcasting control apparatus according to a second example embodiment.

FIG. 14 is a block diagram illustrating an example of a configuration of a broadcasting control apparatus 500 according to the second example embodiment. With reference to FIG. 14, the broadcasting control apparatus 500 includes a time generating unit 510 and a correction unit 520.

The time generating unit 510 generates a system time for broadcasting control, the system time being synchronized with a reference time in accordance with a predetermined time protocol. The correction unit 520 corrects, when leap second adjustment information indicating that leap second adjustment is scheduled to be completed at a first time in the reference time is received, the system time by a correction amount depending on a time length D over a correction period having the time length D from a second time earlier than the first time. The time length D is set such that a correction amount per second of the system time is equal to or less than a cycle corresponding to an inverse of a video frame rate.

Broadcasting control processing for controlling the broadcasting station system or the node in the broadcasting station system may include the operation steps of the broadcasting control apparatus 500. A computer program causing a processor to execute those operation steps may be provided. A non-transitory computer-readable recording medium that stores the computer program causing a processor to execute those operation steps may be provided. In addition, any function or processing related to the correction of the system time described in the first example embodiment may be applied to the present example embodiment.

4. Supplement

Hereinabove, some example embodiments according to the present disclosure are described in detail using FIG. 1 to FIG. 14. In the example embodiments described above, the system time for broadcasting control is generated, the system time being synchronized with the reference time in accordance with the predetermined time protocol, and when the leap second adjustment information indicating that the leap second adjustment is scheduled to be completed at the first time in the reference time is received, the system time is corrected by the correction amount depending on the time length D over the correction period having the time length D from the second time earlier than the first time. The time length D is set long enough such that the time progress rate is not precipitously changed, and thus, the leap second adjustment can be performed without preventing the stable broadcast signal processing in a manner such that the sequence order of time is ensured.

Particularly, in the example embodiment described above, the time length D is set such that the correction amount per second of the system time is equal to or less than a cycle corresponding to an inverse of a video frame rate. This means that in a case in which the video frame rate is R [Hz], the time length D [sec] satisfies D≥R. In this case, the deviation of the apparent elapsed time of the system time with respect to the actual elapsed time of one second is 1/R [sec] at most, equal to or less than one video frame cycle. Therefore, even if video frame processing is affected by the time correction, the number of affected frames does not exceed one frame per second. Accordingly, for example, the apparatus reproducing a video based on the corrected system time can stably perform reproduction processing without impairing a subjective quality of a reproduced video by discarding or duplicating a video frame at a very small frequency.

In the example embodiments described above, when a leap second is inserted in the reference time, the corrected system time may be determined as the sum of the corrected elapsed time obtained by multiplying the elapsed time since the second time by the ratio (D−1)/D and the second time. This allows the time progress rate to be moderately reduced over the time length D to make a time gap corresponding to the insertion of the leap second of a second.

In the example embodiments described above, when a leap second is deleted from the reference time, the corrected system time may be determined as the sum of the corrected elapsed time obtained by multiplying the elapsed time since the second time by the ratio (D+1)/D and the second time. This allows the time progress rate to be moderately raised over the time length D to smoothly complete the leap second adjustment without skipping the apparent time.

In an example, the correction period may end at the first time described above. In this case, the reference time and the system time can be made to match each other when the leap second adjustment ends without the continuance, for a long time, of the state where the reference time differs from the corrected system time. In another example, the correction period may end at the third time T3 that is earlier than the first time T1. In this case, the third time can be flexibly selected to perform the correction described above with a timing being avoided at which the time progress distortion is undesirable.

Note that the technique of the present disclosure is not limited to the example embodiments described above. It should be understood by those of ordinary skill in the art that these example embodiments are merely examples and that various alterations are possible without departing from the scope and the spirit of the present disclosure.

For example, the processing steps illustrated in the flowchart are not necessarily performed in the illustrated order. For example, the processing steps may be performed in an order different from that illustrated, or two or more processing steps may be performed in parallel. Some of the processing steps may be deleted, or further processing steps may be added.

The function of the node described in the Specification may be realized by any of software, hardware, and a combination of software and hardware. Program instructions of a computer program constituting software are, for example, stored in a non-transitory computer-readable recording medium inside or outside of the node, and read into a memory when executed and executed by a processor.

The technique described in the Specification as those realized by a single apparatus or a single node may be realized as a system in which a plurality of apparatuses or a plurality of nodes cooperate each other.

The whole or part of the example embodiments disclosed above can be described as, but not limited to, the following supplementary notes.

(Supplementary Note 1)

A broadcasting control apparatus including:

a time generating unit configured to generate a system time for broadcasting control, the system time being synchronized with a reference time in accordance with a predetermined time protocol; and a correction unit configured to, when leap second adjustment information indicating that leap second adjustment is scheduled to be completed at a first time in the reference time is received, correct the system time by a correction amount depending on a time length D over a correction period having the time length D from a second time earlier than the first time, wherein the time length D is set such that a correction amount per second of the system time is equal to or less than a cycle corresponding to an inverse of a video frame rate.

(Supplementary Note 2)

The broadcasting control apparatus according to supplementary note 1, wherein the correction unit is configured to, when a leap second is inserted in the reference time, determine a sum of a corrected elapsed time obtained by multiplying an elapsed time since the second time by a ratio (D−1)/D and the second time as the corrected system time.

(Supplementary Note 3)

The broadcasting control apparatus according to supplementary note 1 or 2, wherein the correction unit is configured to, when a leap second is deleted from the reference time, determine a sum of a corrected elapsed time obtained by multiplying an elapsed time since the second time by a ratio (D+1)/D and the second time as the corrected system time.

(Supplementary Note 4)

The broadcasting control apparatus according to supplementary note 1, wherein the correction unit is configured to, when a leap second is inserted in the reference time, determine the corrected system time by subtracting from the reference time a quotient obtained by dividing an elapsed time since the second time by the time length D.

(Supplementary Note 5)

The broadcasting control apparatus according to supplementary note 1 or 2, wherein the correction unit is configured to, when a leap second is deleted from the reference time, determine the corrected system time by adding to the reference time a quotient obtained by dividing an elapsed time since the second time by the time length D.

(Supplementary Note 6)

The broadcasting control apparatus according to any one of supplementary notes 1 to 5, wherein the video frame rate is 60 Hz.

(Supplementary Note 7)

The broadcasting control apparatus according to any one of supplementary notes 1 to 6, wherein the correction period ends at the first time.

(Supplementary Note 8)

The broadcasting control apparatus according to any one of supplementary notes 1 to 6, wherein the correction period ends at a third time earlier than the first time.

(Supplementary Note 9)

The broadcasting control apparatus according to any one of supplementary notes 1 to 8, further including a communication unit configured to transmit correction-related information associated with the correction of the system time to another apparatus that utilizes the corrected system time.

(Supplementary Note 10)

The broadcasting control apparatus according to supplementary note 9, wherein the correction-related information includes one or more of the corrected system time, the correction amount, the second time, the time length D, and a time at which the correction period ends.

(Supplementary Note 11)

The broadcasting control apparatus according to any one of supplementary notes 1 to 10, wherein the leap second adjustment information includes:

information indicating that the leap second adjustment is scheduled to be completed at the first time; and information indicating whether a leap second is inserted or deleted.

(Supplementary Note 12)

The broadcasting control apparatus according to any one of supplementary notes 1 to 11, further including a broadcasting control unit configured to refer to the corrected system time, and instruct a start of broadcast of a television program according to a predefined schedule.

(Supplementary Note 13)

The broadcasting control apparatus according to any one of supplementary notes 1 to 11, further including a stream transmitting unit configured to insert time information based on the corrected system time into a broadcast signal stream to be transmitted.

(Supplementary Note 14)

The broadcasting control apparatus according to any one of supplementary notes 1 to 11, further including a stream receiving unit configured to receive a broadcast signal stream at a timing determined based on the corrected system time.

(Supplementary Note 15)

The broadcasting control apparatus according to any one of supplementary notes 1 to 14, wherein the predetermined time protocol is Network Time Protocol (NTP).

(Supplementary Note 16)

The broadcasting control apparatus according to any one of supplementary notes 1 to 14, wherein the predetermined time protocol is Precision Time Protocol (PTP).

(Supplementary Note 17)

A broadcasting control method including:

generating a system time for broadcasting control, the system time being synchronized with a reference time in accordance with a predetermined time protocol; and correcting, when leap second adjustment information indicating that leap second adjustment is scheduled to be completed at a first time in the reference time is received, the system time by a correction amount depending on a time length D over a correction period having the time length D from a second time earlier than the first time, wherein the time length D is set such that a correction amount per second of the system time is equal to or less than a cycle corresponding to an inverse of a video frame rate.

(Supplementary Note 18)

A computer program causing a processor of a broadcasting control apparatus to execute:

generating a system time for broadcasting control, the system time being synchronized with a reference time in accordance with a predetermined time protocol; and correcting, when leap second adjustment information indicating that leap second adjustment is scheduled to be completed at a first time in the reference time is received, the system time by a correction amount depending on a time length D over a correction period having the time length D from a second time earlier than the first time, wherein the time length D is set such that a correction amount per second of the system time is equal to or less than a cycle corresponding to an inverse of a video frame rate.

(Supplementary Note 19)

A non-transitory computer-readable recording medium storing a computer program therein, the computer program causing a processor of a broadcasting control apparatus to execute:

generating a system time for broadcasting control, the system time being synchronized with a reference time in accordance with a predetermined time protocol; and correcting, when leap second adjustment information indicating that leap second adjustment is scheduled to be completed at a first time in the reference time is received, the system time by a correction amount depending on a time length D over a correction period having the time length D from a second time earlier than the first time, wherein the time length D is set such that a correction amount per second of the system time is equal to or less than a cycle corresponding to an inverse of a video frame rate.

This application claims priority based on JP 2019-053031 filed on Mar. 20, 2019, the entire disclosure of which is incorporated herein.

INDUSTRIAL APPLICABILITY

The technique of the present disclosure is not limited to, but available to a system in the broadcasting station.

REFERENCE SIGNS LIST

100, 200, 300, 400, 500 Broadcasting Control Apparatus
110, 210, 310 Communication Interface (Communication Unit)
120 User Interface
130 Storage Unit
140, 440 Time Processing Unit
150, 510 System Time Generating Unit (Time Generating Unit)
160, 520 Correction Unit
170 Time Output Unit
180 Broadcasting Control Unit
220 Stream Acquiring Unit
280 Stream Transmitting Unit
380 Stream Receiving Unit
390 Stream Processing Unit
450 PTP Client
480 Video Synchronization Signal Generating Unit
T1 First Time
T2 Second Time
T3 Third Time

What is claimed is:

1. A broadcasting control apparatus comprising:
a memory storing instructions; and
one or more processors configured to execute the instructions to:
generate a system time for broadcasting control, the system time being synchronized with a reference time in accordance with a predetermined time protocol; and
when leap second adjustment information indicating that leap second adjustment is scheduled to be completed at a first time in the reference time is received, correct the system time by a correction amount depending on a time length D over a correction period having the time length D from a second time earlier than the first time,
wherein the time length D is set such that a correction amount per second of the system time is equal to or less than a cycle corresponding to an inverse of a video frame rate.

2. The broadcasting control apparatus according to claim 1, wherein the one or more processors are further configured to, when a leap second is inserted in the reference time, determine a sum of a corrected elapsed time obtained by multiplying an elapsed time since the second time by a ratio (D−1)/D and the second time as the corrected system time.

3. The broadcasting control apparatus according to claim 1 wherein the one or more processors are further configured to, when a leap second is deleted from the reference time, determine a sum of a corrected elapsed time obtained by multiplying an elapsed time since the second time by a ratio (D+1)/D and the second time as the corrected system time.

4. The broadcasting control apparatus according to claim 1, wherein the one or more processors are further configured to, when a leap second is inserted in the reference time, determine the corrected system time by subtracting from the reference time a quotient obtained by dividing an elapsed time since the second time by the time length D.

5. The broadcasting control apparatus according to claim 1 wherein the one or more processors are further configured to, when a leap second is deleted from the reference time, determine the corrected system time by adding to the reference time a quotient obtained by dividing an elapsed time since the second time by the time length D.

6. The broadcasting control apparatus according to claim 1, wherein the video frame rate is 60 Hz.

7. The broadcasting control apparatus according to claim 1, wherein the correction period ends at the first time.

8. The broadcasting control apparatus according to claim 1, wherein the correction period ends at a third time earlier than the first time.

9. The broadcasting control apparatus according to claim 1, wherein the one or more processors are further configured to transmit correction-related information associated with the correction of the system time to another apparatus that utilizes the corrected system time.

10. The broadcasting control apparatus according to claim 9, wherein the correction-related information includes one or more of the corrected system time, the correction amount, the second time, the time length D, and a time at which the correction period ends.

11. The broadcasting control apparatus according to claim 1, wherein the leap second adjustment information includes:
information indicating that the leap second adjustment is scheduled to be completed at the first time; and
information indicating whether a leap second is inserted or deleted.

12. The broadcasting control apparatus according to claim 1, wherein the one or more processors are further configured to refer to the corrected system time, and instruct a start of broadcast of a television program according to a predefined schedule.

13. The broadcasting control apparatus according to 1, claim 1, wherein the one or more processors are further configured to insert time information based on the corrected system time into a broadcast signal stream to be transmitted.

14. The broadcasting control apparatus according to claim 1, wherein the one or more processors are further configured to receive a broadcast signal stream at a timing determined based on the corrected system time.

15. The broadcasting control apparatus according to claim 1, wherein the predetermined time protocol is Network Time Protocol (NTP).

16. The broadcasting control apparatus according to claim 1, wherein the predetermined time protocol is Precision Time Protocol (PTP).

17. A broadcasting control method comprising:
generating a system time for broadcasting control, the system time being synchronized with a reference time in accordance with a predetermined time protocol; and
correcting, when leap second adjustment information indicating that leap second adjustment is scheduled to be completed at a first time in the reference time is received, the system time by a correction amount depending on a time length D over a correction period having the time length D from a second time earlier than the first time,
wherein the time length D is set such that a correction amount per second of the system time is equal to or less than a cycle corresponding to an inverse of a video frame rate.

18. A non-transitory computer-readable recording medium storing a computer program therein, the computer program causing a processor of a broadcasting control apparatus to execute:
generating a system time for broadcasting control, the system time being synchronized with a reference time in accordance with a predetermined time protocol; and
correcting, when leap second adjustment information indicating that leap second adjustment is scheduled to be completed at a first time in the reference time is received, the system time by a correction amount depending on a time length D over a correction period having the time length D from a second time earlier than the first time,
wherein the time length D is set such that a correction amount per second of the system time is equal to or less than a cycle corresponding to an inverse of a video frame rate.

* * * * *